US008580001B2

(12) United States Patent
Thacker et al.

(10) Patent No.: US 8,580,001 B2
(45) Date of Patent: Nov. 12, 2013

(54) METHOD AND APPARATUS FOR ASSEMBLING GASIFICATION REACTOR INJECTION DEVICES

(75) Inventors: Pradeep Thacker, Bellaire, TX (US); Anindra Mazumdar, Houston, TX (US); Dhaval Mistry, Houston, TX (US)

(73) Assignee: General Electric Company, Schenectady, NY (US)

( * ) Notice: Subject to any disclaimer, the term of this patent is extended or adjusted under 35 U.S.C. 154(b) by 1144 days.

(21) Appl. No.: 12/196,063

(22) Filed: Aug. 21, 2008

(65) Prior Publication Data

US 2010/0043290 A1     Feb. 25, 2010

(51) Int. Cl.
*C10J 3/50*     (2006.01)

(52) U.S. Cl.
USPC ............... 48/86 R; 48/DIG. 7; 239/132.5

(58) Field of Classification Search
USPC ........... 48/86 R, DIG. 7; 239/132.5; 431/160, 431/190
See application file for complete search history.

(56) References Cited

U.S. PATENT DOCUMENTS

| | | | |
|---|---|---|---|
| 2,702,744 A | 2/1955 | Friedrich | |
| 2,838,105 A * | 6/1958 | Du Bois et al. | 239/132.3 |
| 3,971,635 A | 7/1976 | Matthews | |
| 3,971,636 A | 7/1976 | Matthews | |
| 3,971,637 A | 7/1976 | Matthews | |
| 3,971,638 A | 7/1976 | Matthews | |
| 3,971,639 A | 7/1976 | Matthews | |
| 4,007,108 A | 2/1977 | Leas | |
| 4,017,271 A | 4/1977 | Barclay et al. | |
| 4,445,444 A * | 5/1984 | Espedal | 110/261 |
| 4,491,456 A | 1/1985 | Schlinger | |
| 4,527,997 A * | 7/1985 | Espedal | 48/86 R |
| 5,209,656 A * | 5/1993 | Kobayashi et al. | 431/187 |
| 5,261,602 A * | 11/1993 | Brent et al. | 239/132.3 |
| 6,852,762 B2 | 2/2005 | De Graaf et al. | |
| 6,877,322 B2 | 4/2005 | Fan | |

FOREIGN PATENT DOCUMENTS

WO     0007713 A1     2/2000

OTHER PUBLICATIONS

International Search Report issued in connection with corresponding PCT Application No. PCT/US2009/051112 on May 3, 2010.

* cited by examiner

*Primary Examiner* — Jill Warden
*Assistant Examiner* — Joye L Woodard
(74) *Attorney, Agent, or Firm* — Armstrong Teasdale LLP (57) ABSTRACT

A method of assembling a gasification reactor includes extending at least one reactant injection member into the gasification reactor. The method also includes extending at least one fluid injection conduit including a plurality of fluid injection passages defined therein into the gasification reactor. At least a portion of the at least one fluid injection conduit circumscribes at least a portion of the at least one reactant injection member.

15 Claims, 6 Drawing Sheets

METHOD AND APPARATUS FOR ASSEMBLING GASIFICATION REACTOR INJECTION DEVICES

BACKGROUND OF THE INVENTION

This invention relates generally to chemical production systems, and more particularly to gasification systems, such as gasification systems used in an integrated gasification combined-cycle (IGCC) power generation plant, and more particularly, to methods and apparatus for assembling injection devices for gasification reactors.

Most known IGCC plants include a gasification system that is integrated with at least one power-producing turbine system. For example, at least some known gasification systems convert a mixture of fuel, air or oxygen, steam, and/or $CO_2$ into a synthetic gas, or "syngas." The syngas is channeled to the combustor of a gas turbine engine, which powers an electrical generator that supplies electrical power to a power grid. Exhaust from at least some known gas turbine engines is supplied to a heat recovery steam generator (HRSG) that generates steam for driving a steam turbine. Power generated by the steam turbine also drives an electrical generator that provides electrical power to the power grid.

At least some known gasification systems include an injection system that supplies a gasification reactor with process fluids to facilitate at least one exothermic reaction. The injection system may include at least one injection device that is partially exposed to such exothermic reactions and the associated high temperatures. Such high temperatures may reduce the useful life span of some of the components associated with the injection devices. Moreover, at least some known gasification systems inject recycled carbon dioxide ($CO_2$) into the vicinity of the exothermic reactions to facilitate syngas production. However, some of these known gasification systems do not inject the $CO_2$ in a manner effective for facilitating such syngas production.

BRIEF DESCRIPTION OF THE INVENTION

In one aspect, method of assembling a gasification reactor includes extending at least one reactant injection member into the gasification reactor. The method also includes extending at least one fluid injection conduit including a plurality of fluid injection passages defined therein into the gasification reactor. At least a portion of the at least one fluid injection conduit circumscribes at least a portion of the at least one reactant injection member In another aspect, an injection device is provided. The injection device includes at least one reactant injection member extending into a gasification reactor. The injection device also includes at least one fluid injection conduit extending into the gasification reactor. At least a portion of the at least one fluid injection conduit circumscribes at least a portion of the at least one reactant injection member. The at least one fluid injection conduit comprises a plurality of fluid injection passages defined therein.

In yet another aspect, a gasification system is provided. The system includes at least one carbonaceous reactant source, at least one oxygenated reactant source, and at least one fluid source. The system also includes at least one gasification reactor including at least one injection device coupled in flow communication with the at least one carbonaceous reactant source and the at least one oxygenated reactant source. The at least one injection device includes at least one reactant injection member extending into the gasification reactor. The at least one injection device also includes at least one fluid injection conduit coupled in flow communication with the at least one fluid source and extending into the gasification reactor. At least a portion of the at least one fluid injection conduit circumscribes at least a portion of the at least one reactant injection member. The at least one fluid injection conduit includes a plurality of fluid injection passages defined therein.

The method and apparatus for assembling a gasification reactor as described herein extends to methods and apparatus for assembling reactant injection devices within such gasification reactors. The injection devices include at least one fluid conduit disposed about the reactant injection device to facilitate shielding the device from an environment within the gasification reactor proximate to the device. The environment includes heat that is a result of exothermic reactions within the reactor. Use of such fluid conduit facilitates extending the service life expectancy of injection device components, thereby reducing maintenance costs and unit outages. Moreover, the sizing and number of fluid injection passages formed within the fluid conduit facilitates control of the temperature and gasification reaction kinetics within the vicinity of such passages including the recirculation pattern within the reactor.

DETAILED DESCRIPTION OF THE INVENTION

The method and apparatus for assembling a gasification reactor as described herein extends to the method and apparatus for assembling reactant injection devices within such gasification reactors. The injection devices include at least one fluid conduit disposed about the reactant injection device to facilitate at least partially shielding at least a portion of the device from at least a portion of an environment within the gasification reactor proximate to the device. The environment includes heat that is a result of exposure to exothermic reactions within the reactor. Insulation against such heat facilitates extending the service life expectancy of injection device components, thereby reducing maintenance costs and unit outages. Moreover, the sizing and number of fluid injection passages formed within the fluid conduit facilitates control of the temperature and gasification reaction kinetics within the vicinity of such passages. Specifically, such control is facilitated by predetermined velocities and distributions of the fluid streams injected into the gasification reactor, thereby facilitating control of the recirculation pattern within the reactor.

Figure 1:
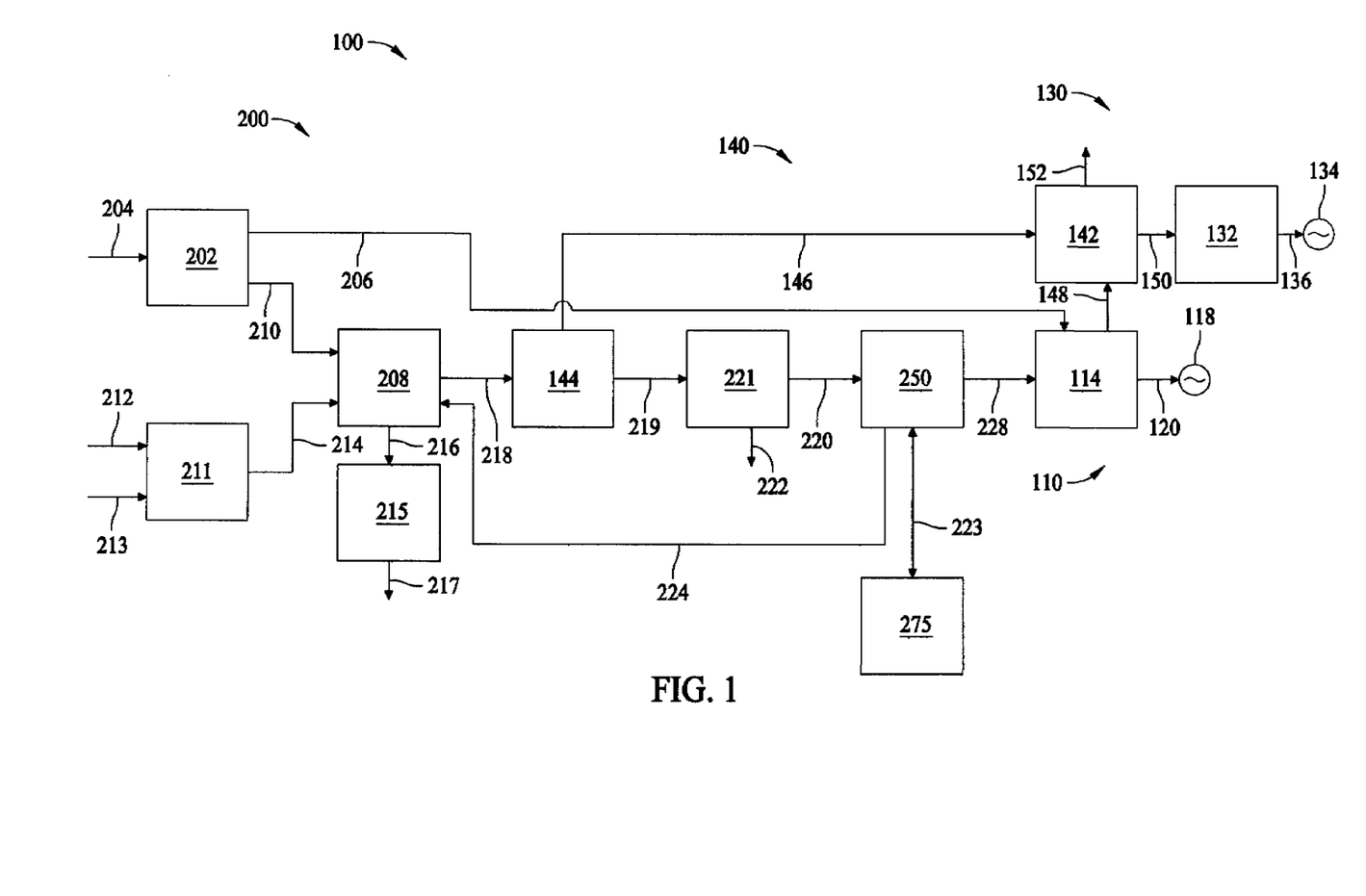
FIG. 1 is a schematic diagram of an exemplary integrated gasification combined-cycle (IGCC) power generation plant.

FIG. 1 is a schematic diagram of an exemplary chemical production system, specifically, an exemplary gasification system, and more specifically, an exemplary integrated gasification combined-cycle (IGCC) power generation plant 100. In the exemplary embodiment, IGCC plant includes a gas turbine engine 110. Turbine 114 is rotatably coupled to a first electrical generator 118 via a first rotor 120. Turbine 114 is coupled in flow communication with at least one fuel source and at least one air source (both described in more detail below) and is configured to receive the fuel and air from the fuel source and the air source, respectively. Turbine 114 is configured to mix air and fuel, produce hot combustion gases (not shown), and convert the heat energy within the gases to rotational energy. The rotational energy is transmitted to generator 118 via rotor 120, wherein generator 118 is configured to facilitate converting the rotational energy to electrical energy (not shown) for transmission to at least one load, including, but not limited to, an electrical power grid (not shown).

IGCC plant 100 also includes a steam turbine engine 130. In the exemplary embodiment, engine 130 includes a steam turbine 132 rotatably coupled to a second electrical generator 134 via a second rotor 136.

IGCC plant 100 further includes a steam generation system 140. In the exemplary embodiment, system 140 includes at least one heat recovery steam generator (HRSG) 142 that is coupled in flow communication with at least one heat transfer apparatus 144 via at least one heated boiler feedwater conduit 146. HRSG 142 is configured to receive boiler feedwater (not shown) from apparatus 144 via conduit 146 for facilitating heating the boiler feedwater into steam. HRSG 142 is also configured to receive exhaust gases (not shown) from turbine 114 via an exhaust gas conduit (not shown) to further facilitate heating the boiler feedwater into steam. HRSG 142 is coupled in flow communication with turbine 132 via a steam conduit 150. Excess gasses and steam are exhausted from HRSG 142 to the atmosphere via stack gas conduit 152.

Conduit 150 is configured to channel steam (not shown) from HRSG 142 to turbine 132. Turbine 132 is configured to receive the steam from HRSG 142 and convert the thermal energy in the steam to rotational energy. The rotational energy is transmitted to generator 134 via rotor 136, wherein generator 134 is configured to facilitate converting the rotational energy to electrical energy (not shown) for transmission to at least one load, including, but not limited to, the electrical power grid. The steam is condensed and returned as boiler feedwater via a condensate conduit (not shown).

IGCC plant 100 also includes a gasification system 200. In the exemplary embodiment, system 200 includes at least one air separation unit 202 coupled in flow communication with an air source via an air conduit 204. The air sources include, but are not limited to, dedicated air compressors and compressed air storage units (neither shown). Unit 202 is configured to separate air into oxygen ($O_2$), nitrogen ($N_2$) and other components (neither shown). The other components are released via a vent (not shown). $N_2$ is channeled to gas turbine 114 via a $N_2$ conduit to facilitate combustion.

System 200 includes a gasification reactor 208 that is coupled in flow communication with unit 202 and is configured to receive the $O_2$ channeled from unit 202 via an $O_2$ conduit 210. Therefore, unit 202 is an oxygenated reactant source that generates the oxygenated reactant $O_2$. System 200 also includes a coal grinding and slurrying unit 211. Unit 211 is coupled in flow communication with a coal source and a water source (neither shown) via a coal supply conduit 212 and a water supply conduit 213, respectively. Therefore, unit 211 is a carbonaceous reactant source that mixes the coal and water to form a carbonaceous reactant stream, or a coal slurry reactant stream (not shown) that is channeled to reactor 208 via a coal slurry conduit 214.

Reactor 208 is configured to receive the coal slurry reactant stream and an $O_2$ reactant stream via conduits 214 and 210, respectively. Reactor 208 is also configured to facilitate production of a hot, raw synthetic gas (syngas) stream (not shown). The raw syngas includes carbon monoxide (CO), hydrogen ($H_2$), carbon dioxide ($CO_2$), carbonyl sulfide (COS), and hydrogen sulfide ($H_2S$). While $CO_2$, COS, and $H_2S$ are typically collectively referred to as acid gases, or acid gas components of the raw syngas, hereon, $CO_2$ will be discussed separately from the remaining acid gas components. Moreover, reactor 208 is also configured to produce a hot slag stream (not shown) as a by-product of the syngas production. The slag stream is channeled to a slag handling unit 215 via a hot slag conduit 216. Unit 215 is configured to quench and break up the slag into small slag pieces wherein a slag removal stream is produced and channeled through conduit 217.

Reactor 208 is coupled in flow communication with heat transfer apparatus 144 via a raw hot syngas conduit 218. Apparatus 144 is configured to receive the hot, raw syngas stream and transfer at least a portion of the heat to HRSG 142 via conduit 146. Subsequently, apparatus 144 produces a cooled raw syngas stream (not shown) that is channeled to a scrubber and low temperature gas cooling (LTGC) unit 221 via a syngas conduit 219. Unit 221 is configured to remove particulate matter entrained within the raw syngas stream and facilitate removal of the removed matter via a fly ash conduit 222. Unit 221 is also configured to further cool the raw syngas stream. Moreover, unit 221 is configured to convert at least a portion of COS in the raw syngas stream to $H_2S$ and $CO_2$ via hydrolysis.

System 200 further includes an acid gas removal subsystem 250 that is coupled in flow communication with unit 221 and is configured to receive the cooled raw syngas stream via a raw syngas conduit 220. Subsystem 250 is also configured to facilitate removal of at least a portion of acid components (not shown) from the raw syngas stream as discussed further below. Such acid gas components include, but are not limited to, $CO_2$, COS, and $H_2S$. Subsystem 250 is further configured to facilitate separation of at least some of the acid gas components into components that include, but are not limited to, $CO_2$, COS, and $H_2S$. Moreover, subsystem 250 is coupled in flow communication with a sulfur reduction subsystem 275 via a conduit 223. Subsystem 275 is also configured to receive and facilitate separation of at least some of the acid gas components into components that include, but are not limited to, $CO_2$, COS, and $H_2S$. Furthermore, subsystem 275 is configured to channel a final integrated gas stream (not shown) to reactor 208 via subsystem 250 and a final integrated gas stream conduit 224. The final integrated gas stream includes predetermined concentrations of $CO_2$, COS, and $H_2S$.

Subsystem 250 is coupled in flow communication with reactor 208 via conduit 224 wherein the final integrated gas stream is channeled to predetermined portions of reactor 208. The separation and removal of such $CO_2$, COS, and $H_2S$ via subsystems 250 and 275 facilitates producing a clean syngas stream (not shown) that is channeled to gas turbine 114 via a clean syngas conduit 228.

In operation, air separation unit 202 receives air via conduit 204. The air is separated into $O_2$, $N_2$ and other components. The other components are vented via a vent, the $N_2$ is channeled to turbine 114 via conduit 206 and the $O_2$ is channeled to gasification reactor 208 via conduit 210. Also, in operation, coal grinding and slurrying unit 211 receives coal and water via conduits 212 and 213, respectively, forms a coal slurry reactant stream and channels the coal slurry stream to reactor 208 via conduit 214.

Reactor 208 receives the $O_2$ reactant stream via conduit 210, coal via conduit 214, and the final integrated gas stream from subsystem 250 via conduit 224. Reactor 208 facilitates production of a hot raw syngas stream that is channeled to apparatus 144 via conduit 218. The slag by-product that is formed in reactor 208 is removed via slag handling unit 215 and conduits 216 and 217. Apparatus 144 facilitates cooling the hat raw syngas stream to produce a cooled raw syngas stream that is channeled to scrubber and LTGC unit 221 via conduit 219 wherein particulate matter is removed from the syngas via conduit 222, the syngas is cooled further, and at least a portion of COS is converted to $H_2S$ and $CO_2$ via hydrolysis. The cool raw syngas stream is channeled to acid gas removal subsystem 250 wherein acid gas components are substantially removed such that a clean syngas stream is formed and channeled to gas turbine 114 via conduit 228.

Moreover, in operation, at least a portion of the acid components removed from the syngas stream is channeled to subsystem 275 via conduit 223 wherein acid components are removed and separated such that the final integrated gas stream is channeled to reactor 208 via subsystem 250 and conduit 224.

Further, in operation, turbine 114 receives $N_2$ and clean syngas via conduits 206 and 228, respectively. Turbine 114 combusts the syngas fuel, produces hot combustion gases and channels the hot combustion gases to induce rotation of turbine 114 which subsequently rotates first generator 118 via rotor 120.

At least a portion of the heat removed from the hot syngas via heat transfer apparatus 144 is channeled to HRSG 142 via conduit 146 wherein the heat boils water to form steam. The steam is channeled to steam turbine 132 via conduit 150 and induces a rotation of turbine 132. Turbine 132 rotates second generator 134 via second rotor 136.

Figure 2:
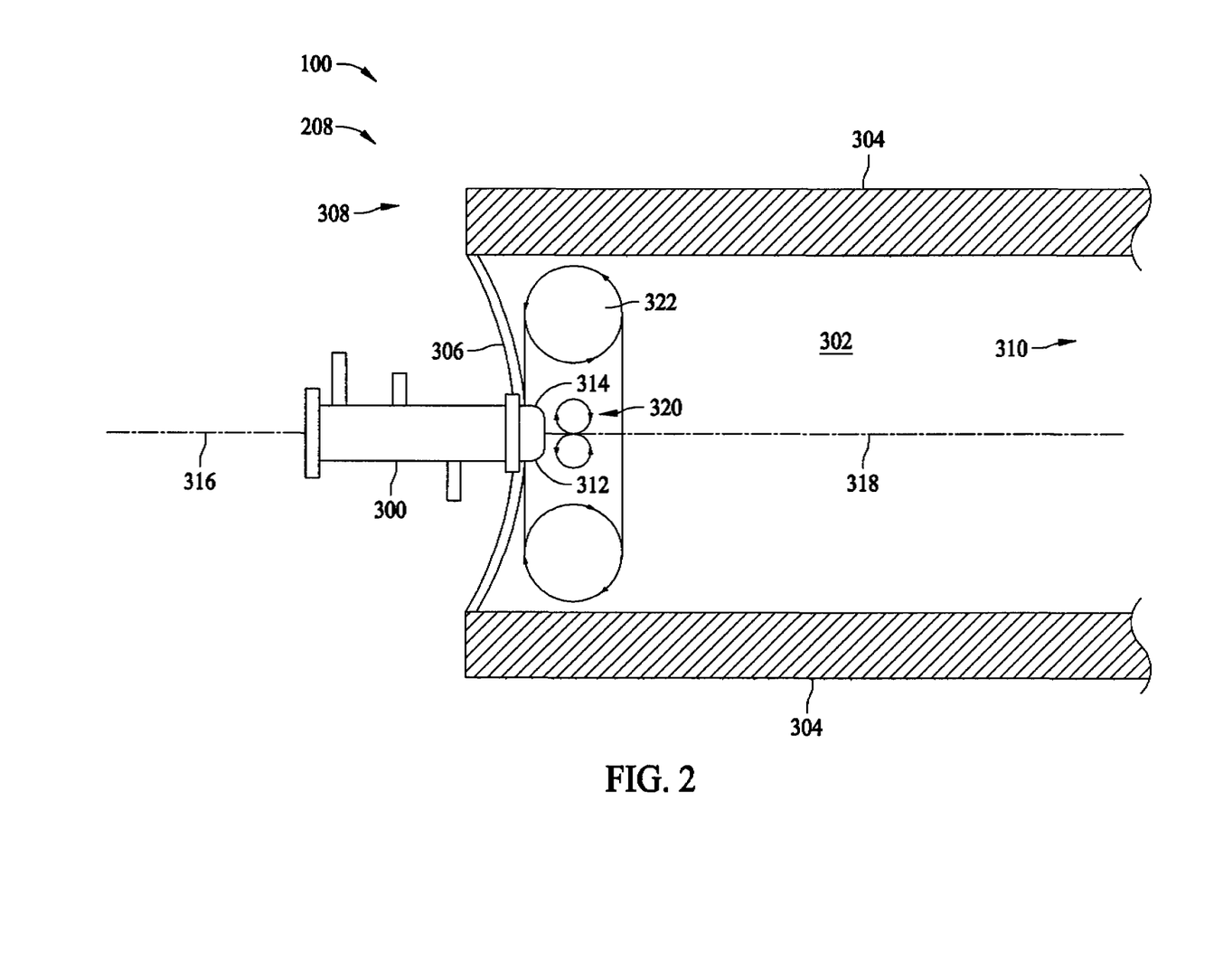
FIG. 2 is a schematic view of an exemplary gasification reactor that may be used for synthetic gas generation, such as may be used with the IGCC power generation plant shown in FIG. 1.

FIG. 2 is a schematic view of gasification reactor 208. In the exemplary embodiment, reactor 208 includes at least one reactant injection device 300 that is coupled in flow communication with a gasification cavity 302. More specifically, in the exemplary embodiment, device 300 is an annular triplet gasifier injector nozzle that includes three annular passages. Alternatively, device 300 may be any injector nozzle that includes, but is not limited to, configurations with four or more annular passages.

Cavity 302 is at least partially defined by a substantially cylindrical reactor wall 304 and a head end cover 306. In the exemplary embodiment, gasification reactor 208 is substantially cylindrical. Alternatively, reactor 208 may have any configuration that facilitates operation of reactor 208 as described herein. Also, in the exemplary embodiment, device 300 has a substantially horizontal orientation (described further below). Alternatively, device 300 may be oriented with any orientation such as, but not limited to, a substantially vertical orientation.

In the exemplary embodiment, wall 304 includes at least one ceramic refractory material that includes, but is not limited to, heat tempered bricks. Alternatively, wall 304 is fluid-cooled, wherein the cooling fluids include, but are not limited to, air and water. Cover 306 is sealingly coupled to at least a portion of a head end portion 308 of reactor 208. Cavity 302 is also partially defined by a tail end cover (not shown in FIG. 2) that is sealingly coupled to at least a portion of wall 304, wherein the tail end cover is positioned on a tail end portion 310 that is opposite portion 308.

In the exemplary embodiment, injection device 300 includes a tip portion 312 that is inserted through an aperture 314 defined in head end cover 306 and is sealingly coupled to head end cover 306 using any known fastening method that enables injection device 300 to function as described herein, such as, but not limited to, retention hardware (not shown in FIG. 2). Reactor 208 is oriented such that an axial centerline 316 of injection device 300 is substantially collinear with a longitudinal centerline 318 of gasification cavity 302. Tip portion 312 facilitates the formation of a plurality of recirculation zones, for example, a first recirculation zone 320 and a second recirculation zone 322, within cavity 302. Specifically, tip portion 312 is configured to form first recirculation zone 320, which is substantially toroidal and defined in close proximity to, and substantially centered about, centerline 318. Also, specifically, tip portion 312 is configured to form second recirculation zone 322 that is substantially toroidal, and that is substantially centered about centerline 318 in close proximity to wall 304. In the exemplary embodiment, first recirculation zone 320 is substantially centered within second recirculation zone 322.

Figure 3:
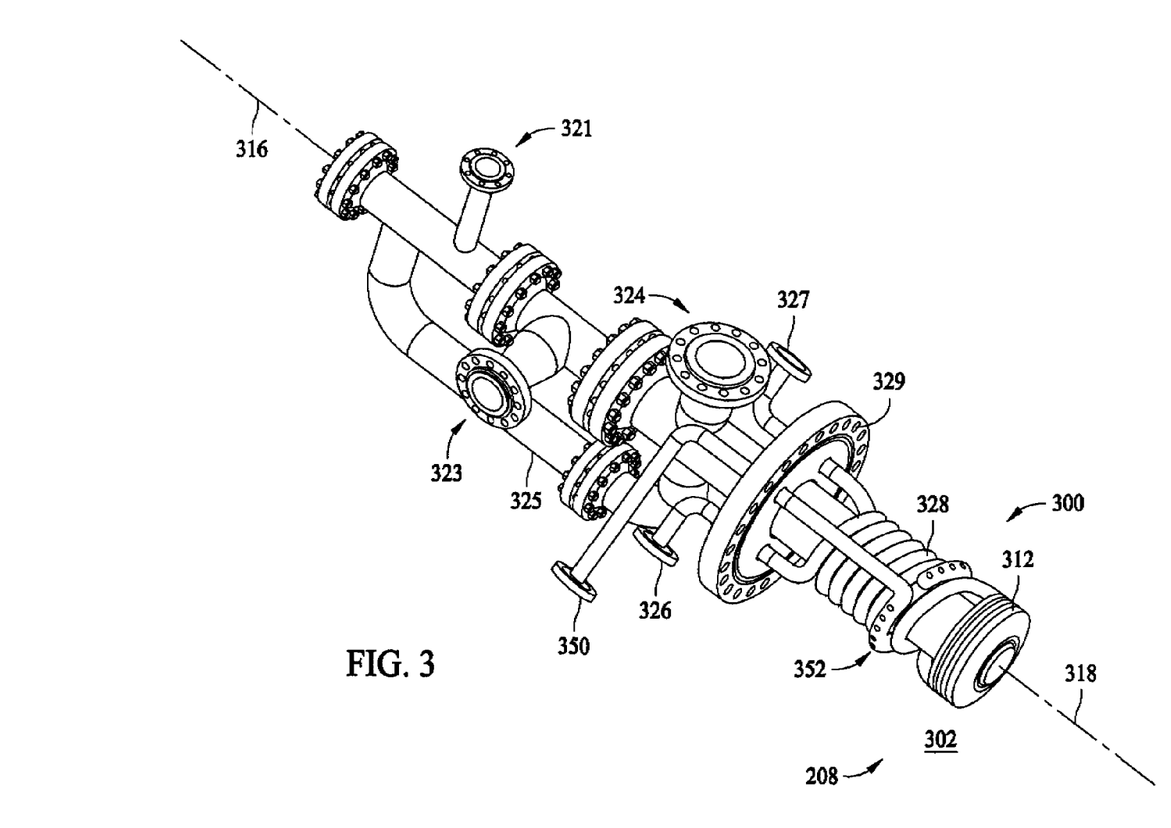
FIG. 3 is a schematic perspective view of an exemplary injection device that may be used with the gasification reactor shown in FIG. 2.

FIG. 3 is a schematic perspective view of exemplary injection device 300 that may be used with gasification reactor 208 (shown in FIG. 2). Injection device axial centerline 316 and gasification cavity longitudinal centerline 318 are illustrated for perspective. In the exemplary embodiment, injection device 300 includes an inner gaseous oxygen (GOX) supply section 321 that is coupled in flow communication to a GOX source that is similar to GOX conduit 210 (shown in FIG. 1). Injection device 300 also includes a center slurry section 323 that is coupled in flow communication to a slurry source that is similar to material slurry conduit 214 (shown in FIG. 1). Injection device 300 also includes an outer GOX supply section 324 that is coupled in flow communication to a GOX source that is similar to GOX conduit 210. At least a portion of supply section 324 extends about at least a portion of slurry section 323, and at least a portion of slurry section 323 extends about at least a portion of inner GOX supply section 321. Therefore, sections 321, 323, and 324 define a plurality of substantially annular passages or channels, or, specifically, an inner GOX channel, a center slurry channel, and an outer GOX channel (not shown in FIG. 3) within assembly 319.

Injection device 300 also includes a GOX bypass line 325 that establishes at least some flow communication between sections 324 and 321 such that GOX mass flow rate distribution is facilitated. Predetermined ratios of an outer GOX mass flow rate, a center slurry mass flow rate, and an inner GOX mass flow rate are maintained. Bypass line 325 facilitates the installation and the operation of injection device 300 in retrofits of gasification reactor 208. Alternatively, apparatus that include, but are not limited to, flow orifices and manually-operated and automated throttle valves may be used in conjunction with, or in lieu of, bypass line 325. Moreover, alternatively, reactant injection device 300 may have no GOX bypass line 325 and no alternative apparatus that operates in a manner similar to line 325.

In addition, injection device 300 includes a cooling fluid supply manifold 326 and a cooling fluid return manifold 327 that are each coupled in flow communication with tip portion 312 of injection device 300. Manifolds 326 and 327 form a plurality of cooling fluid coils 328 with a substantially helical configuration. Manifolds 326 and 327 facilitate channeling a cooling fluid to remove heat from tip portion 312 as discussed further below. Injection device 300 also includes a mounting flange 329 that is removably, and sealingly, coupled to head end cover 306 (see FIG. 2) using any known fastening method, such as, but not limited to, retention hardware (not shown in FIG. 3).

Moreover, injection device 300 includes a fluid injection conduit, or manifold 350 that is coupled in flow communication with a fluid source (not shown). In the exemplary embodiment, the fluid is carbon dioxide ($CO_2$). Alternatively, the fluid may be any reactive, moderating, and/or catalytic fluid including, but not limited to, steam, water, oxygen, liquid carbonaceous fuels, gaseous carbonaceous fuels, hydrogen ($H_2$), hydrogen sulfide ($H_2S$), and $CO_2$-rich gas. Manifold 350 extends through flange 329 to extend into gasification cavity 302 of gasification reactor 208 and includes a plurality of fluid, or $CO_2$, injection passages 352 formed and defined within manifold 350. In the exemplary embodiment, manifold 350 and passages 352 are configured to channel $CO_2$ into gasification reactor 208. Alternatively, manifold 350 and passages 352 are configured to channel any reactive, moderating, and/or catalytic fluid into reactor 208 including, but not limited to, steam, water, oxygen, liquid carbonaceous fuels, gaseous carbonaceous fuels, hydrogen ($H_2$), hydrogen sulfide ($H_2S$), and $CO_2$-rich gas. Conduit 350 and passages 352 may be integrated with any injector design. In the exemplary embodiment, manifold 350 is formed into a single loop that circumscribes and is placed in contact with at least a portion of plurality of cooling fluid coils 328.

Figure 4:
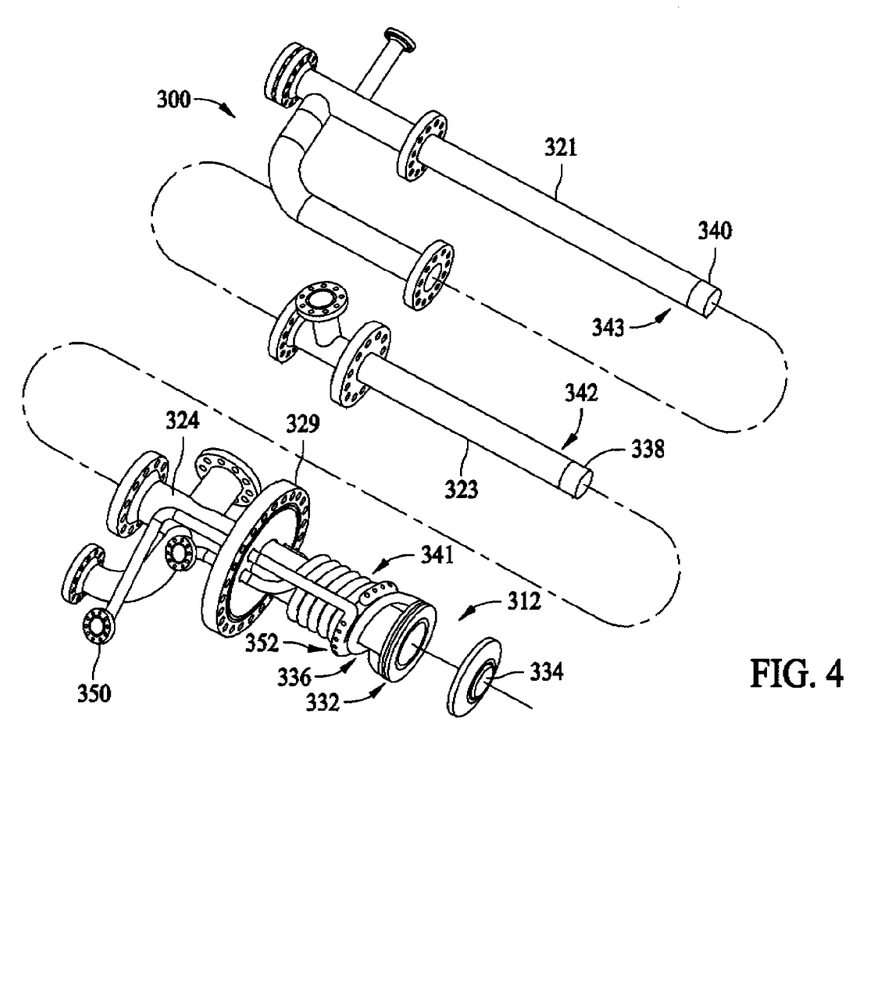
FIG. 4 is an exploded view of the exemplary injection device shown in FIG. 3.

FIG. 4 is an exploded view of exemplary injection device 300. In the exemplary embodiment, inner GOX supply section 321 is positioned at least partially within slurry supply section 323, which is at least partially positioned within outer GOX supply section 324. Sections 321, 323, and 324 are also referred to as bayonets. Tip portion 312 is configured to control the flow of supply fluids between injection device 300 and gasification cavity 302. In the exemplary embodiment, tip portion 312 includes an adapter portion 332 and a modular tip 334. Alternatively, adapter portion 332 may be fabricated as an extension of assembly 319 rather than tip portion 312. Moreover, as illustrated in the exemplary embodiment, adapter portion 332 includes three substantially annular adapters: an injector body adapter 336, an outer GOX adapter 338, and a slurry adapter 340. Adapters 336, 338, and 340 are coupled in flow communication to sections 324, 323 and 321, respectively. More specifically, injector body adapter 336 is coupled to an inner GOX section end 341 of section 324. Outer GOX adapter 338 is coupled to a middle slurry section end 342 of section 323. Slurry adapter 340 is coupled to an outer GOX section end 343 of section 321.

An exemplary method of assembling gasification reactor 208 includes extending at least one reactant injection device 300 member, or outer GOX supply section 324, into gasification reactor 208. The method also includes extending at least one fluid, or $CO_2$, injection conduit 350 including a plurality of fluid, or $CO_2$, injection passages 352 defined therein into gasification reactor 208. At least a portion of at least one $CO_2$ injection conduit 350 circumscribes at least a portion of outer GOX supply section 324.

Figure 5:
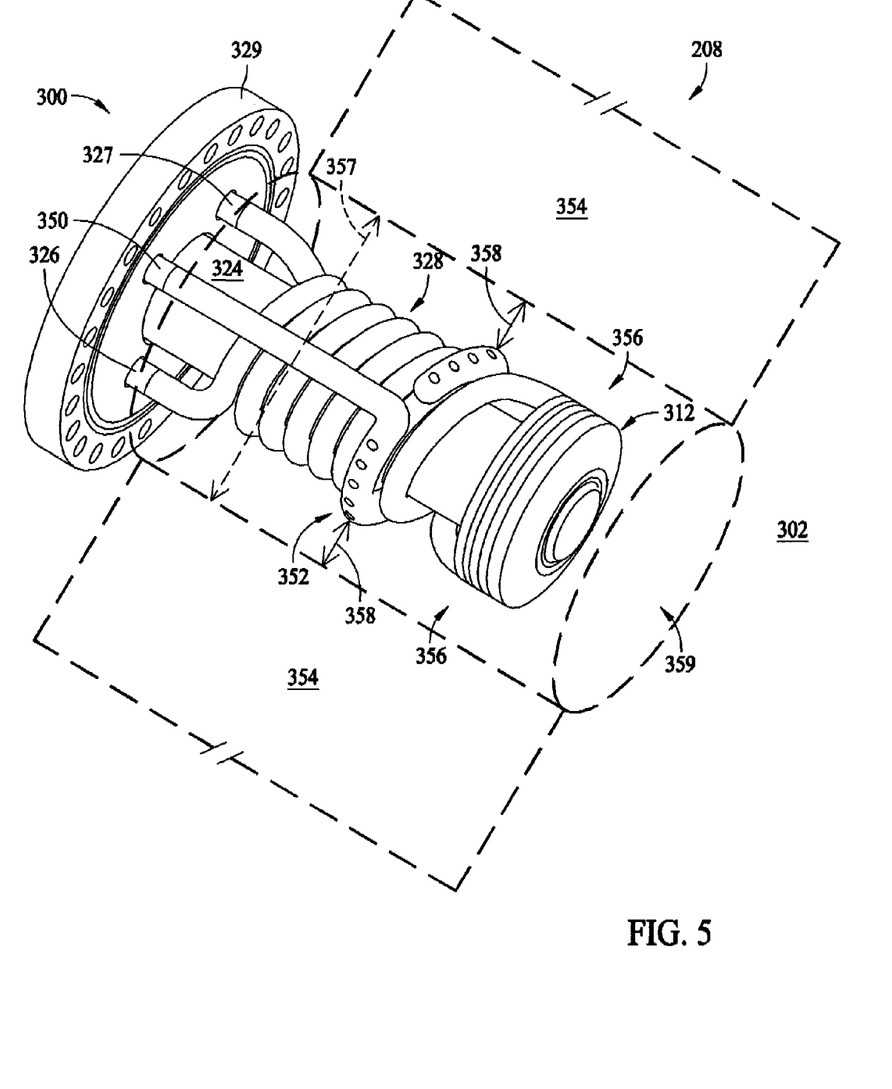
FIG. 5 is a schematic perspective view of an exemplary carbon dioxide ($CO_2$) manifold that may be used with the injection device shown in FIG. 3.

FIG. 5 is a schematic perspective view of exemplary carbon dioxide ($CO_2$) manifold 350 that may be used with injection device 300. A refractory enclosure, or cylinder 354 is formed within gasification cavity 302 about at least a portion of head end cover 306 and/or wall 304 (both shown in FIG. 2). In the exemplary embodiment, manifolds 326, 327, and 350, fluid cooling coils 328, and at least a portion of tip 312 are recessed within a refractory cylinder cavity 356 that is at least partially defined by cylinder 354. Alternatively, any portion of manifolds 326, 327, and 350, fluid cooling coils 328, and tip 312 are recessed within refractory cylinder cavity 356. Cylinder 354 is formed and cavity 356 is defined to further define an opening 359 that is coupled in flow communication with cavity 356 and gasification cavity 302. Such opening 359 facilitates disassembly, removal, and replacement of portions of 312 through opening 359, without disassembly, removal and replacement of injection device 300 and flange 329. Moreover, opening 359 facilitates reactant injection into cavity 302 from tip 312. Furthermore, tip 312 extends such that it is one of recessed within, flush with, or protruding from opening 359. Alternatively, any refractory enclosure having any shape and/or orientation that enables injection device 300 to function as described herein is used including, but not limited to, rectangular configurations.

Manifold 350 is coupled in flow communication with a $CO_2$ source. In the exemplary embodiment, the $CO_2$ source is coupled in flow communication with subsystems 250 and 275 (both shown in FIG. 1), wherein the $CO_2$ source receives and stores recycled $CO_2$ from subsystems 250 and 275. For example, but not limited to, one source of $CO_2$ is final integrated gas stream conduit 224 (shown in FIG. 1), wherein the final integrated gas stream includes predetermined concentrations of $CO_2$, COS, and $H_2S$. Alternatively, any $CO_2$ source is used that facilitates operation of system 100 as described herein. Also, alternatively, any fluid is used that facilitates operation of system 100 as described herein. Manifold 350 extends through flange 329 to extend into cavity 356 and includes a plurality of $CO_2$ passages 352 formed and defined within manifold 350.

In the exemplary embodiment, manifold 350 is formed into a single loop that circumscribes and is placed in contact with at least a portion of plurality of cooling fluid coils 328. Moreover, a predetermined inner diameter 357 of cylinder 354 facilitates forming a predetermined distance 358 between manifold 350 and cylinder 354 such that passages 352 are substantially unobstructed. Alternatively, any configuration of manifold 350 is used, including, but not limited to, multiple and partial loops.

Each of plurality of $CO_2$ injection passages 352 is sized and positioned within conduit 350 to facilitate control of the temperature and gasification reaction kinetics within the vicinity of such passages. Moreover, the number of passages 352 further facilitates such control. Specifically, such control is facilitated by predetermined values of parameters that include, but are not limited to, $CO_2$ velocities, $CO_2$ flow rates, $CO_2$ densities, as well as directions and spatial distributions of $CO_2$ streams (not shown) injected into gasification reactor 208. Such parameter values are uniquely determined for features that include, but are not limited to, predetermined gasifier performance ratings, size of gasifier 208, and size of injector 300. Therefore, such $CO_2$ injection parameters thereby facilitate control of reactant kinetics that include, but are not limited to, temperature of a portion of gasification reactor 208 in the vicinity of manifold 350, the recirculation pattern, and/or first recirculation zone 320 and second recirculation zone 322 (both shown in FIG. 2) within cavity 302. Moreover, specifically, such $CO_2$ injection parameters facilitate controlling a temperature of a portion of gasification reactor 208 in the vicinity of manifold 350.

Furthermore, specifically, such $CO_2$ injection parameters facilitate forming a heat shield within cylinder cavity 356 that cooperates with refractory cylinder 354 to deflect heat formed by the reactions within gasifier cavity 302. Such heat deflection and insulation of those portions of device 300 that are enclosed within cavity 356 facilitates extending the service life expectancy of injection device 300. In the exemplary embodiment, distance 358 is sized such that passages 362 are substantially unobstructed, and control of reactant kinetics, temperatures in the vicinity of manifold 350, and heat deflection and insulation within cylinder cavity 356, all as described above, are facilitated.

Figure 6:
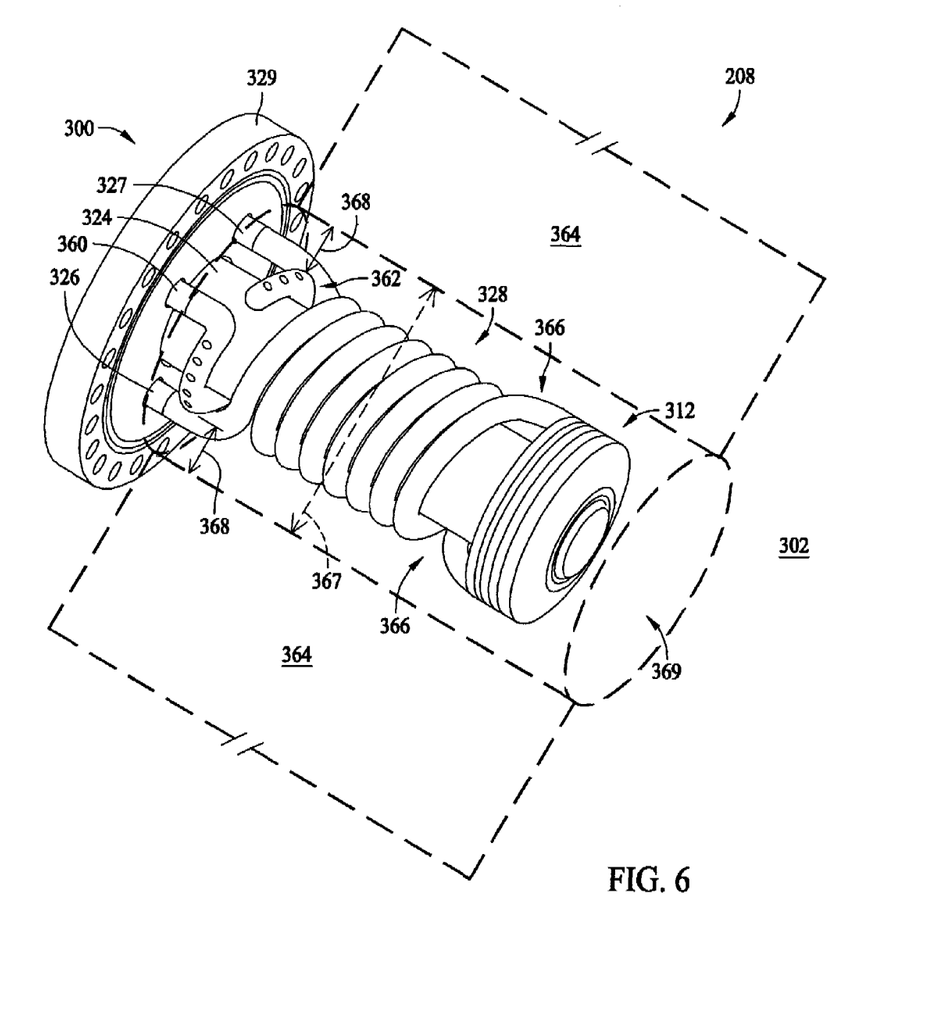
FIG. 6 is a schematic perspective view of an alternative carbon dioxide ($CO_2$) manifold that may be used with the injection device shown in FIG. 3.

FIG. 6 is a schematic perspective view of an alternative $CO_2$ manifold 360 that may be used with injection device 300. Similar to manifold 350 (shown in FIG. 5), manifold 360 includes a plurality of $CO_2$ passages 362 formed and defined within manifold 360. Moreover, passages 362 are configured to inject $CO_2$ with injection parameters similar to those associated with passages 352 (shown in FIG. 5).

In this alternative embodiment, a refractory enclosure, or cylinder 364 is formed within gasification cavity 302 about at least a portion of head end cover 306 and/or wall 304 (both shown in FIG. 2). Manifolds 326, 327, and 360, fluid cooling coils 328, and at least a portion of tip 312 are recessed within a refractory cylinder cavity 366 that is at least partially defined by cylinder 364. Alternatively, any portion of manifolds 326, 327, and 360, fluid cooling coils 328, and tip 312 are recessed within refractory cylinder cavity 366. Cylinder 364 is formed and cavity 366 is defined to further define an opening 369 that is coupled in flow communication with cavity 366 and gasification cavity 302. Such opening 369 facilitates disassembly, removal, and replacement of portions of 312 through opening 369, without disassembly, removal and replacement of injection device 300 and flange 329. Moreover, opening 369 facilitates reactant injection into cavity 302 from tip 312. Furthermore, tip 312 extends such that it is one of recessed within, flush with, or protruding from opening 369. Alternatively, any refractory enclosure having any shape and/or orientation that enables injection device 300 to function as described herein is used including, but not limited to, rectangular configurations.

Manifold 360 is coupled in flow communication with a $CO_2$ source. In the exemplary embodiment, the $CO_2$ source is coupled in flow communication with subsystems 250 and 275 (both shown in FIG. 1), wherein the $CO_2$ source receives and stores recycled $CO_2$ from subsystems 250 and 275. For example, but not limited to, one source of $CO_2$ is final integrated gas stream conduit 224 (shown in FIG. 1), wherein the final integrated gas stream includes predetermined concentrations of $CO_2$, COS, and $H_2S$. Alternatively, any $CO_2$ source is used that facilitates operation of system 100 as described herein. Also, alternatively, any fluid is used that facilitates operation of system 100 as described herein.

Manifold 360 extends through flange 329 to extend into cavity 366 and includes a plurality of $CO_2$ passages 362 formed and defined within manifold 360. Manifold 360 is distinguished from manifold 350 in that manifold 360 is formed into a single loop that is placed in contact with outer GOX supply section 324. Moreover, a predetermined inner diameter 367 of cylinder 364 facilitates forming a predetermined distance 368 between manifold 360 and cylinder 364 such that passages 362 are substantially unobstructed. Alternatively, any configuration of manifold 360 is used, including, but not limited to, multiple and partial loops. Inner diameter 357 (shown in FIG. 5) is greater than inner diameter 367, thereby decreasing the materials, labor, and costs used to form cylinder 364 as compared to those used to form cylinder 354.

Each of plurality of $CO_2$ injection passages 362 is sized and positioned within conduit 360 to facilitate control of the temperature and gasification reaction kinetics within the vicinity of such passages. Moreover, the number of passages 362 further facilitates such control. Therefore, such $CO_2$ injection thereby facilitates control of reactant kinetics that include, but are not limited to, temperature of a portion of gasification reactor 208 in the vicinity of manifold 360, the recirculation pattern, and/or first recirculation zone 320 and second recirculation zone 322 (both shown in FIG. 2) within cavity 302. Moreover, specifically, such $CO_2$ injection parameters facilitate controlling a temperature of a portion of gasification reactor 208 in the vicinity of manifold 360. Passages 362 are formed to reduce $CO_2$ impingement on plurality of coils 328.

Furthermore, specifically, such $CO_2$ injection parameters facilitate forming a heat shield within cylinder cavity 366 that cooperates with refractory cylinder 364 to deflect heat formed by the reactions within gasifier cavity 302. Such heat deflection and insulation of those portions of device 300 that are enclosed within cavity 366 facilitates extending the service life expectancy of injection device 300. In this alternative embodiment, distance 368 may be either the same, less than, or greater than distance 358 (shown in FIG. 5) such that passages 362 are substantially unobstructed, and control of reactant kinetics, temperatures in the vicinity of manifold 360, and heat deflection and insulation within cylinder cavity 366, all as described above, are facilitated.

Alternatively, any combination of the embodiments illustrated in FIGS. 5 and 6, that is, any combination of manifolds 350 and 360 and passages 352 and 362, respectively, may be used.

The method and apparatus for assembling a gasification reactor as described herein extends to the method and apparatus for assembling reactant injection devices within such gasification reactors. The injection devices include at least one fluid conduit disposed about the reactant injection device to facilitate at least partially shielding at least a portion of the device from at least a portion of an environment within the gasification reactor proximate to the device. The environment includes heat that is a result of exposure to exothermic reactions within the reactor. Insulation of such heat facilitates extending the service life expectancy of injection device components, thereby reducing maintenance costs and unit outages. Moreover, the sizing and number of fluid injection passages formed within the fluid conduit facilitates control of the temperature and gasification reaction kinetics within the vicinity of such passages. Specifically, such control is facilitated by predetermined parameter values that include velocities and distributions of the fluid streams injected into the gasification reactor, thereby facilitating control of the recirculation pattern within the reactor.

Exemplary embodiments of syngas production as associated with IGCC plants are described above in detail. The methods, apparatus and systems are not limited to the specific embodiments described herein nor to the specific illustrated IGCC plants. While the invention has been described in terms of various specific embodiments, those skilled in the art will recognize that the invention can be practiced with modification within the spirit and scope of the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of assembling an injection device for a gasification reactor, said method comprising:

extending at least one reactant injection member through a flange coupled to a refractory enclosure such that the reactant injection member extends into the the refractory enclosure for injecting a first fluid into a gasification cavity within the gasification reactor;

extending at least one fluid injection conduit through the flange such that a loop portion of the at least one fluid injection conduit extends into the refractory enclosure and circumscribes at least a portion of the at least one reactant injection member, wherein a plurality of fluid injection passages are defined in the loop portion such that a second fluid is channeled through the plurality of fluid injection passages and is discharged outward from the at least one reactant iniection member towards a surface of the refractory enclosure and into the gasification cavity.

2. A method according to claim 1 wherein extending at least one reactant injection member through a flange comprises:

coupling the at least one reactant injection member to at least one reactant source; and orienting the at least one reactant injection member to inject at least one reactant into the gasification reactor.

3. A method in accordance with claim 1 further comprising coupling at least one coolant conduit to the at least one reactant injection member, wherein the at least one coolant conduit is configured to supply a coolant to the at least one reactant injection member to facilitate removing heat from the at least one reactant injection member.

4. A method in accordance with claim 3 further comprising coupling the at least one fluid injection conduit to at least one of:

the at least one coolant conduit, thereby facilitating shielding at least a portion of the reactant injection member from at least a portion of an environment within the gasification reactor;

the reactant injection member, thereby facilitating shielding at least a portion of the reactant injection member from at least a portion of an environment within the gasification reactor; and the reactant injection member, thereby facilitating shielding at least a portion of the flange from at least a portion of an environment within the gasification reactor.

5. A method in accordance with claim 1 wherein extending at least one fluid injection conduit comprises coupling the at least one fluid injection conduit to a fluid source such that each of the plurality of fluid injection passages defined within the at least one fluid injection conduit facilitates injecting a fluid into the gasification reactor with at least one of:

a predetermined fluid injection velocity;
a predetermined fluid flow rate; and
a predetermined fluid spatial distribution.

6. A method in accordance with claim 1 wherein extending at least one fluid injection conduit comprises coupling the at least one fluid injection conduit to a fluid source such that each of the plurality of fluid injection passages defined within the at least one fluid injection conduit facilitates at least one of:

controlling a temperature of a portion of the gasification reactor in the vicinity of the at least one reactant injection member;

controlling reactant kinetics within the gasification reactor; and controlling a reactant recirculation pattern within the gasification reactor.

7. An injection device for use in a gasification reactor, said injection device comprising:

a refractory enclosure comprising an opening oriented to couple a cavity defined in said refractory enclosure in flow communication with a gasification cavity within the gasification reactor;

a flange for coupling to said refractory enclosure;

at least one reactant injection member extending through said flange into said refractory enclosure cavity for injecting a first fluid into said gasification cavity;

at least one fluid injection conduit extending through said flange into said refractory enclosure cavity, said at least one fluid injection conduit comprises a loop portion circumscribing at least a portion of said at least one reactant injection member between said flange and said tip portion and spaced apart from said tip portion, said loop portion comprises a plurality of fluid injection passages defined therein configured to channel a second fluid through said plurality of fluid injection passages and to discharge the second fluid outward from said at least one reactant injection member towards a surface of said refractory enclosure and into the gasification cavity; and a tip portion coupled to said reactant injection member, said tip portion for controlling the flow of the first and second fluids from said injection device.

8. An injection device in accordance with claim 7 further comprising at least one coolant conduit coupled to said at least one reactant injection member, said at least one coolant conduit facilitates removing heat from said at least one reactant injection member.

9. An injection device in accordance with claim 8 wherein said at least one fluid injection conduit is coupled to at least one of:

said at least one coolant conduit, thereby facilitating shielding at least a portion of said reactant injection member from at least a portion of an environment within the gasification reactor;

said reactant injection member, thereby facilitating shielding at least a portion of said reactant injection member from at least a portion of an environment within the gasification reactor; and said reactant injection member, thereby facilitating shielding at least a portion of said flange from at least a portion of an environment within the gasification reactor.

10. An injection device in accordance with claim 7 wherein each of said plurality of fluid injection passages defined within said loop portion is configured to inject fluid into the gasification reactor with at least one of:

a predetermined fluid injection velocity;
a predetermined fluid flow rate; and
a predetermined fluid spatial distribution.

11. A gasification system comprising:

at least one carbonaceous reactant source;
at least one oxygenated reactant source;
at least one fluid source; and
at least one gasification reactor comprising at least one injection device coupled in flow communication with said at least one carbonaceous reactant source and said at least one oxygenated reactant source, said at least one injection device comprising:

a refractory enclosure comprising an opening oriented to couple a cavity defined in said refractory enclosure in flow communication with a gasification cavity within the gasification reactor;

a flange coupled to said refractory enclosure;

at least one reactant injection member extending through said flange into said refractory enclosure cavity for injecting an oxygenated reactant first fluid into said gasification cavity;

at least one fluid injection conduit coupled in flow communication with said at least one fluid source and extending through said flange into said-refractory enclosure cavity, said at least one fluid injection conduit comprises a loop portion circumscribing at least a portion of said at least one reactant injection member between said flange and said tip portion and spaced apart from said tip portion, said loop portion comprises a plurality of fluid injection passages defined therein configured to channel a second fluid through said plurality of fluid injection passages and to channel a second fluid through said plurality of fluid injection passages and to discharge the second fluid outward from said at least one reactant injection member towards a surface of said refractory enclosure and into the gasification cavity of said at least one gasification reactor; and a tip portion coupled to said at least one reactant injection member, said tip portion to control the flow of the first and second fluids from said injection device.

12. A gasification system in accordance with claim 11 further comprising at least one coolant conduit coupled to said at least one reactant injection member, said at least one coolant conduit facilitates removing heat from said at least one reactant injection member.

13. A gasification system in accordance with claim 12 wherein said at least one fluid injection conduit is coupled to at least one of:

said at least one coolant conduit, thereby facilitating shielding at least a portion of said reactant injection member from at least a portion of an environment within said at least one gasification reactor;

said reactant injection member, thereby facilitating shielding at least a portion of said reactant injection member from at least a portion of an environment within said at least one gasification reactor; and said reactant injection member, thereby facilitating shielding at least a portion of said flange from at least a portion of an environment within said at least one gasification reactor.

14. A gasification system in accordance with claim 11 wherein each of said plurality of fluid injection passages defined within said loop portion of said at least one fluid injection conduit is configured to inject fluid into said at least one gasification reactor with at least one of:
 a predetermined fluid injection velocity;
 a predetermined fluid flow rate; and
 a predetermined fluid spatial distribution.

15. A gasification system in accordance with claim 11 wherein each of said plurality of fluid injection passages defined within said loop portion of said at least one fluid injection conduit is configured to inject fluid into said at least one gasification reactor to facilitate control of at least one of:
 a temperature of a portion of said at least one gasification reactor in the vicinity of said at least one reactant injection member;
 reactant kinetics within said at least one gasification reactor; and
 a reactant recirculation pattern within said at least one gasification reactor.

\* \* \* \* \*